Figure 3:
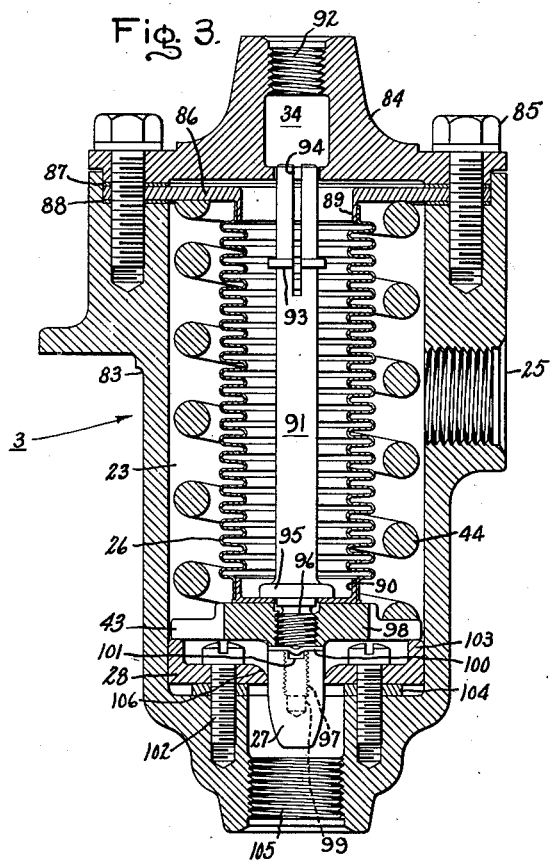

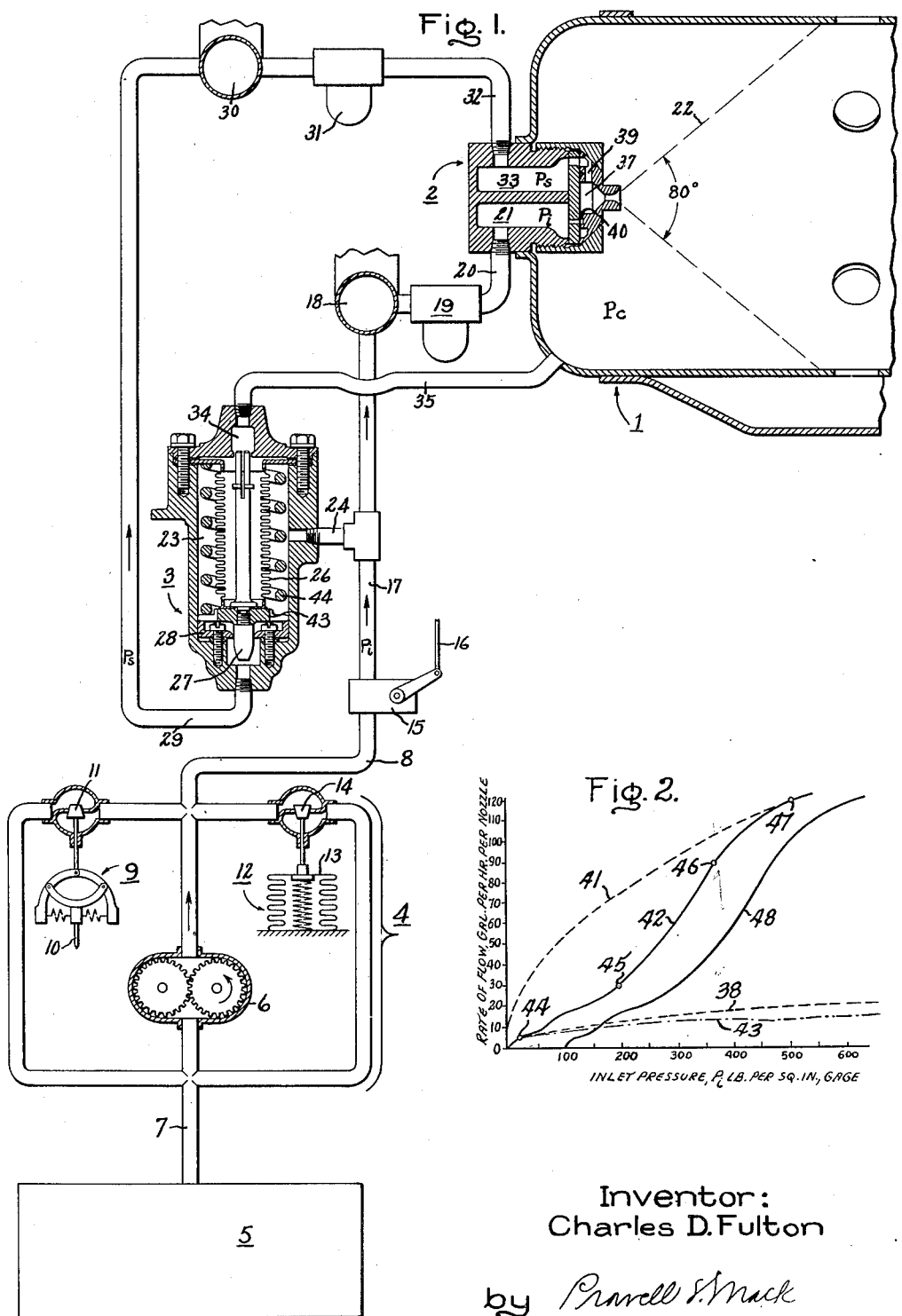

April 1, 1952 C. D. FULTON 2,590,853
LIQUID FUEL METERING AND SPRAYING SYSTEM
Filed Oct. 16, 1945 2 SHEETS—SHEET 2

Inventor:
Charles D. Fulton
by Pravell S. Mack
His Attorney.

Patented Apr. 1, 1952

2,590,853

UNITED STATES PATENT OFFICE 2,590,853

LIQUID FUEL METERING AND SPRAYING SYSTEM

Charles D. Fulton, Scotia, N. Y., assignor to General Electric Company, a corporation of New York Application October 16, 1945, Serial No. 622,604

10 Claims. (Cl. 60—39.28)

This invention relates to liquid atomizing spray systems, particularly to apparatus for producing an atomized spray of liquid fuel in a combustion device. It is particularly adaptable to liquid fuel combustors used in gas turbine powerplants, and has special application to such powerplants for the propulsion of aircraft up to very high altitudes and over a wide range of many difficult operating conditions.

The advent of gas turbines for the propulsion of aircraft raised a need for new and greatly improved methods and apparatus for spraying liquid fuels over a wide range of flow rates. In addition, the operating conditions encountered by an aircraft are extremely difficult because of the enormous range of atmospheric temperatures and pressures encountered, particularly in high altitude aircraft. Furthermore, it is generally necessary to employ a plurality of fuel spraying nozzles discharging either into a number of small separate combustion chambers or into one large chamber. For successful use in gas turbine service, it is absolutely essential that fuel be supplied equally to each nozzle and discharged uniformly into the combustion space, in order that the temperature of the hot gas produced will be entirely uniform. This is of the greatest importance because the modern high performance gas turbine operates at a temperature level exceedingly close to the maximum allowable temperature, so that any "hot spot" in the operating medium has a serious effect on the life of the apparatus as well as on the combustion efficiency and fuel economy of the powerplant. With all the increased difficulties encountered, a fuel system for use in aircraft must of course be of the utmost reliability. The requirements of military aircraft are particularily stringent because of the rapid changes in operating conditions met with in fighter aircraft, the need for maximum fuel economy in order to improve the operating range, and the supreme importance of absolute reliability.

In the past, various types of liquid fuel spraying nozzles have been resorted to in order to obtain a wide range of flow rates. One of these was the "recirculating" or "Peabody" type of nozzle, in which a supply pump at all times furnishes liquid approximately at the maximum rate ever required, and a portion of the fuel supplied to the nozzle is returned to the pump or "recirculated" to reduce the amount discharged from the nozzle to the desired rate. Such a nozzle may be satisfactory for stationary or marine use where the size and weight of the fuel system and the power consumed by the pumping apparatus are not critical. It is undesirable however for aircraft use, where size, weight, and power consumed are of the utmost importance.

A perhaps less well-known type of wide range nozzle is what will be referred to herein as the "duplex" type. This nozzle has a discharge orifice, a vortex whirl chamber, two separate sets of orifices or ports for supplying liquid to the vortex chamber, and a liquid supply system arranged to suply liquid to the two sets of ports at various pressures in order to secure the desired total flow rate, while still preserving the velocities required in the vortex chamber to produce a spray with satisfactory characteristics. The duplex nozzle system has important advantages for use in connection with aircraft gas turbines by reason of the fact that all the liquid supplied by the pump is delivered by the nozzle; that is, there is no surplus "recirculation" flow which must be handled by the pump. Therefore with the duplex system, the pump, liquid lines, nozzles, and other components of the system can be made smaller and therefore lighter for given performance characteristics than is possible with a system of the recirculating type.

My invention relates to a new and improved nozzle and other components of a liquid fuel spraying system of the duplex type, and to a new method of operating such a system.

An object of my invention is to provide a liquid fuel spraying system capable of producing a satisfactory atomized spray having a pattern in the shape of a hollow circular cone with a definite preselected minimum vertex angle over an extremely wide range of initial supply pressures and flow rates.

Another object of my invention is to provide a liquid fuel spraying system which can be readily designed to produce a total fuel flow which varies as any desired regular or irregular function of the inlet pressure, within wide limits.

A further object is to provide an improved form of liquid spraying nozzle particularly adapted for use in my improved system.

Another object is to provide a liquid spraying nozzle of the duplex type capable of producing a well atomized spray having a pattern in the form of a wide angle cone which is stable over an extremely wide range of flow rates.

Another object is to provide an improved arrangement of liquid supply orifices or ports in a duplex type nozzle.

A still further object is to provide a new and improved form of metering device for controlling liquid flow in a duplex type nozzle.

Another object is to provide a wide range fuel spraying system having no moving parts associated directly with the nozzle or nozzles, so that the complexity, cost, and difficulty of assembling and servicing the nozzles are reduced.

Still another object is to provide a duplex type nozzle with an orifice tip member which can be easily manufactured, and having ports arranged so that their size can be controlled to very accurate limits by simple manufacturing methods.

Figure 4:
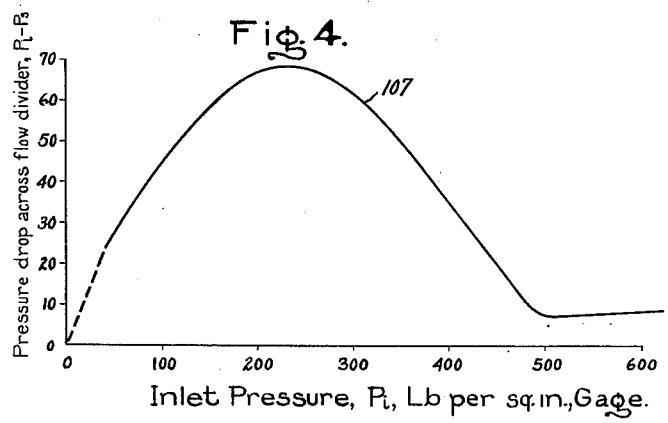

Other objects and advantages will be apparent to those skilled in the art from the following description, taken in connection with the accompanying drawings in which Fig. 1 is a diagrammatic representation of a liquid fuel spraying system in accordance with my invention; Fig. 2 is a graphic representation of the flow characteristics of the system of Fig. 1; Fig. 3 is a sectional view of an improved form of metering device for use in my system; and Fig. 4 is a graphic representation of the pressure drop obtained across the metering device shown in Fig. 3. Attention is directed to the fact that the construction and arrangement of the duplex nozzle per se is claimed in a copending application of Charles D. Fulton et al., Serial No. 724,408, filed January 25, 1947, while the metering device or "flow divider" as shown in Fig. 3 is claimed in a copending application of David C. Ipsen et al., Serial No. 728,916, filed February 15, 1947, now abandoned, both of the above-identified applications having been assigned to the assignee of the present application.

Referring now to Fig. 1, a combustion chamber or "combustor" 1 is supplied with atomized liquid fuel by a vortex spray nozzle 2 of the duplex type. One set of ports 40 in the duplex nozzle is supplied with liquid at the full inlet pressure, while the other set 39 is supplied with liquid at a reduced pressure produced by a metering device 3. Liquid fuel under pressure is furnished by a supply system represented diagrammatically at 4.

The fuel supply system 4 may be of an suitable type such as that disclosed in application Serial No. 525,416, filed in the name of Austin G. Silvester on March 7, 1944, now abandoned, and assigned to the same assignee as the present application. This system includes a fuel supply tank 5, a positive displacement pump 6, represented as being of the well-known gear type driven by any suitable means (not shown) and having a suction conduit 7 and a discharge conduit 8. A combination of auxiliary devices control the discharge pressure of the pump 6 so as to supply liquid to discharge conduit 8 at a pressure which varies as a preselected function of the throttle setting, or of the fuel flow or heat liberation desired. These control devices are represented in Fig. 1 as comprising a speed responsive flyball governor 9 arranged to be driven at a speed proportional to a rotation speed of the powerplant through a shaft 10. This speed governor actuates a bypass valve 11 which permits liquid from the discharge conduit 8 to be returned to the pump inlet conduit 7 as a function of speed. Similarly, barometric device 12 comprises an evacuated bellows 13 arranged to actuate a by-pass valve 14 to reduce the liquid pressure in conduit 8 as a function of altitude, or some other pressure appurtenant to the operation of the system.

Instead of the supply system 4, many other arrangements may be used for supplying fuel to the conduit 8 according to a preselected pressure schedule. One other such system is shown in application Serial No. 605,960, filed July 19, 1945, in the names of M. A. Edwards, D. E. Garr, and H. M. Ogle, and assigned to the same assignee as the present application.

At 15 in Fig. 1 is represented a valve actuated by any suitable linkage 16 which may be arranged to serve both as a stopcock for completely shutting off the supply of liquid to the nozzle system, and also as a throttle valve for metering the fuel in accordance with the fuel flow or heat liberation desired. One such valve is also disclosed in the aforementioned patent application of Austin G. Silvester. It will be apparent that the valve 15 may be considered a part of the fuel supply system 4.

As will be seen from Fig. 1, liquid supply system 4 and valve 15 produce a pressure $P_i$ in the main inlet or "primary" conduit 17. Liquid at pressure $P_i$ is supplied directly from conduit 17 to a manifold 18, thence through a suitable filter 19 and branch conduit 20 to the primary chamber 21 of nozzle 2. For convenience it will be assumed herein that pressure drops in the conduits and filter 19 can be neglected so that the pressure in chamber 21 of the nozzle is the same value $P_i$ as obtains at the entrance to the fuel nozzle system, that is, the discharge side of valve 15. The flow of liquid from the chamber 21 to the fuel spray cone 22 in the combustor 1 will be described more particularly as the description proceeds.

Liquid from conduit 17 is admitted to chamber 23 in the metering device 3 (hereinafter referred to as the "flow divider") through branch conduit 24. As will be noted more particularly in connection with Fig. 3, the pressure $P_i$ of the liquid in chamber 23 causes flexible bellows 26 to collapse to a certain extent and position the metering pin 27 relative to orifice plate 28 so as to vary the effective area of the annular orifice defined thereby as a preselected function of the inlet pressure $P_i$.

It will be readily seen from Fig. 1 that when the inlet pressure $P_i$ rises to a certain value, metering pin 27 will be retracted so as to provide an annular clearance space with orifice plate 28 so that liquid from chamber 23 can flow into conduit 29 and thence to manifold 30, filter 31, branch conduit 32, and into a secondary supply chamber 33 in nozzle 2. For convenience the pressure $P_s$ in the secondary chamber 33 of the nozzle will be considered equal to that obtaining in conduit 29 at the downstream side of metering device 3.

While only one combustor 1 and one nozzle 2 have been illustrated in Fig. 1, it will be understood by those skilled in the art that my system is particularly adapted for use with a plurality of combustors having fuel nozzles in parallel and supplied by branch conduits similar to 20, 32 from manifolds 18 and 30 respectively. Gas turbine powerplants embodying such an arrangement of combustors are disclosed in applications Serial Number 506,930, Alan Howard, filed October 20, 1943, now Patent 2,479,573, and Serial Number 525,391, Dale D. Streid, filed March 7, 1944, now Patent 2,432,359, both assigned to the same assignee as the present application. My fuel nozzle system is shown in connection with the jet engine control system disclosed in the aforementioned Edwards-Garr-Ogle application Serial Number 605,960.

In order to make the description of my improved nozzle system as simple and clear as possible, it will be assumed that the pressure $P_c$ in the combustor is equal to ambient atmospheric pressure. For such operation, the port 34 communicating with the interior of bellows 26 of the flow divider 3 may simply be left open to ambient atmospheric pressure. However, when my fuel nozzle system is used in a gas turbine powerplant, such as those of the above-mentioned Howard and Streid applications, the combustion chamber pressure $P_c$ may vary considerably from atmospheric pressure, in which case I have found it sometimes desirable to bias the flow divider by communicating the combustion chamber pressure $P_c$ to the interior of bellows 26, as by means of a conduit 35. This biasing arrangement has a certain complex effect on the operation of the system which has been found to be beneficial in connection with some of the fuel regulators with which my fuel nozzle system has been used. When biasing conduit 35 is connected to flow divider 3 as shown in Fig. 1, the entire system from inlet conduit 17 to fuel spray 22 constitutes a "closed" hydraulic system, so that a given static pressure drop between 17 and 22 will produce a definite flow rate regardless of the absolute magnitude of the pressures existing in the system. In other words, the flow rate is determined only by the pressure drop, or differential pressure, across the system. Such an operating characteristic is advantageous in certain types of fuel regulators.

However, certain other types of fuel regulators operate more satisfactorily in conjunction with my fuel nozzle system when the biasing conduit 35 is not used, and the interior of the bellows 26 is either at ambient atmospheric pressure, or sealed with a certain amount of gas inside, or evacuated and sealed. Elimination of the pressure sensing conduit 35 has the very considerable advantages of mechanical simplicity, freedom from clogging or freezing of the conduit 35 during high altitude operation, and avoids the possibility of a large amount of liquid fuel being admitted to combustion chamber 1 through conduit 35 in the event of failure of bellows 26. When the pressure sensing conduit 35 is not used, the nozzle system is no longer a closed hydraulic system, for a third pressure, namely, that existing inside bellows 26 exerts an influence on the position of metering pin 27. The effect of this influence is explained later.

The details of the construction of combustor 1 are not necessary to an understanding of the present invention. It is sufficient to note that this combustor is preferably made in accordance with the invention of application Serial No. 750,015, filed May 23, 1947, a continuation-in-part of application Serial No. 501,106, filed September 3, 1943, now abandoned, in the name of Anthony J. Nerad and assigned to the same assignee as the present application. An important characteristic of such a combustor is that the fuel must be sprayed into it with a pattern in the form of a hollow circular cone having a vertex angle which may not decrease below a preselected value, on which the design of the combustor is predicated. In Fig. 1 the fuel spray cone 22 is represented as having an angle of about 80 degrees, which value is selected by analysis and experiment so that unburned liquid particles from the nozzle 2 will not be discharged from the exit portion of the combustion chamber (not shown), and in order to obtain uniformity of temperature distribution in the hot gas leaving the combustor, and for other reasons more fully disclosed in the aforementioned application of Anthony J. Nerad. For the successful and efficient operation of this type of combustor, the fuel spray angle must never under any operating conditions to be encountered fall below the preselected value. It is an important feature of my invention that the nozzle and liquid supply system described herein provides a fuel spray pattern in the form of a cone having an angle which never decreases below this critical value, even though the flow rate and other operating conditions vary over an extremely wide range.

The method of operation of the liquid fuel spraying system shown in Fig. 1 is briefly as follows: It will be assumed first for purposes of illustration that the combustion chamber pressure $P_c$ is equal to ambient atmospheric pressure. For all inlet pressures $P_i$ below a certain critical value, the metering pin 27 of the flow divider 3 is in a position where it completely fills the orifice in plate 28, so that there is no flow through the flow divider into line 29. Therefore, there is no flow from the chamber 33 through the secondary slots 39 to the vortex chamber 37 of nozzle 2, and the entire amount of fluid discharged from the nozzle flows through conduits 17, 18, 19, 20 to chamber 21 and through the primary slots 40 to the vortex chamber 37. When the above-mentioned critical value of pressure $P_i$ is exceeded, bellows 26 in flow divided 3 collapses progressively and retracts the metering pin 27 so as to define with plate 28 an annular orifice through which fuel begins to flow to the secondary slots 39 of the nozzle through conduits 29, 30, 31, 32 and chamber 33. The total fuel flow is then the sum of the flow through the respective primary and secondary slots.

The flow characteristics of my system are more specifically illustrated in Fig. 2, in which the abscissa is inlet pressure $P_i$ in pounds per square inch gage pressure, while the ordinate is the rate of flow in gallons per hour of kerosene, for one nozzle. Curve 38 is approximately a true parabola representing the variation of flow with inlet pressure obtained if the flow divider metering pin 27 is held in closed position (as shown in Fig. 1) so that no liquid flows to conduit 29 and secondary slots 39, all the discharge coming from the small primary slots 40. On the other hand, if the flow divider should be blocked in its wide open position (metering pin 27 fully retracted), then the combined flow through both primary and secondary slots will be represented by the dotted curve 41, which is also nearly a true parabola passing through zero flow at zero pressure. Because combustion chamber pressure $P_c$ was assumed equal to ambient atmospheric pressure, the inlet gage pressure $P_i$ also represents substantially the pressure drop across the nozzle with flow divider blocked open.

If now the flow divider metering pin 27 is permitted to move freely in its intended manner, then as inlet pressure $P_i$ increases the total discharge from nozzle 2 will increase along the solid curve 42 until at a value of perhaps 40 pounds per square inch the flow divider begins to open and admit liquid at an increasing rate into conduit 29. The result is that solid curve 42 increases more rapidly than parabola 38, the difference representing approximately the flow through the large or secondary slots 39.

The mechanical characteristics of the flow divider 3 are such that the effective area of the orifice defined between metering pin 27 and plate 28 increases as a preselected function of initial pressure $P_i$. By a simple test it is possible to determine the axial position of the spider 43 carrying metering pin 27 as a function of the amount the bellows 26 is collapsed against the resistance of spring 44 by inlet pressure $P_i$ acting on the exterior surface of the bellows. Account can also be taken, by calculation, of the small effect on the position of pin 27 caused by the variation of the pressure $P_s$ acting upwardly on the projected area of that portion of pin 27 subjected to the pressure $P_s$ in the discharge chamber of the flow divider.

Knowing the position of pin 27 as a function of inlet pressure $P_i$ and pressure $P_s$, it is possible to design the exterior contour of metering pin 27 so that for any given position (corresponding to known values of these pressures) the effective area of the annular orifice defined between the metering pin 27 and the plate 28 is of the exact size required to give the flow into the large slots required at that particular value of $P_i$. How this is done will be outlined hereinafter. As will be seen from Fig. 2, the solid curve 42 merges with the dotted curve 41 at a value of $P_i$ of about 500 pounds per square inch. This represents the point at which the flow divider reaches its fully open position; and at values of pressure $P_i$ above this point the system performs as if the flow divider were blocked open.

With the flow divider free to move in its intended manner, the flow through the small primary slots 40 does not follow exactly the curve 38, which represents the flow when the flow divider is blocked closed. Instead, as the flow divider begins to open the primary slot flow drops below curve 38 in accordance with the dot-dash curve 43. The reason for this deviation will be discussed more particularly hereinafter.

From a consideration of the structure of my liquid fuel spraying system in the light of the above discussion, it will be readily apparent that the precise shape of the "characteristic curve" 42 from the point where it leaves the parabola 38 to the point where it merges with parabola 41 can be made any desired shape by proper proportioning of the metering pin 27, provided only that curve 42 lies in the area defined between curves 38 and 41. Thus it is apparent that within these limits the secondary slot flow may be made to vary as any desired function, regular or irregular, of the inlet pressure $P_i$. This is an important feature of my invention, for it permits the designer great latitude in matching the characteristics of the fuel nozzle system to the requirements of the powerplant and regulating system with which it is used. For instance, if the system is used in connection with a jet propulsion gas turbine powerplant for aircraft, point 44 corresponding to a flow of approximately 5 gallons per hour per nozzle and an inlet pressure of 20 pounds per square inch gage may represent "idling" operation at high altitude (40,000 feet or above), which is the operating condition requiring minimum fuel flow. The fuel flow for "cruising" operation at medium altitudes (25,000 to 35,000 feet) may be represented by the point 45, corresponding to 30 gallons per hour per nozzle at an inlet pressure of 190 pounds per square inch. "Take-off power" at sea level would similarly be represented by point 46, corresponding to 90 gallons per hour at 365 pounds per square inch; while "military power" rating would be indicated at point 47, corresponding to 120 gallons per hour at an inlet pressure of 500 pounds per square inch.

Thus, for the particular gas-turbine requiring the characteristic curve 42, the fuel system would need to operate satisfactorily over a range of pressures from 20 to 500 pounds per square inch and a range of fuel flow rates from 5 to 120 gallons per hour per nozzle, a range of about 25 to 1. While this range is all that is required for the particular engine on which curve 42 is based, my fuel nozzle system is actually capable of producing a much greater range. For instance, satisfactory operation may be obtained with a system as described herein from approximately 2 gallons per hour to 100 gallons per hour, or a range of 50 to 1.

While my system has so far been described as if the combustion chamber pressure $P_c$ is equal to ambient atmospheric pressure, it should be noted that the effect of increasing the $P_c$ is to shift the curves 38, 41, 42, and 43 laterally to the right, without changing their shape (assuming that biasing conduit 35 is used). Thus with a combustion chamber pressure $P_c$ of 100 pounds per square inch, the characteristic curve 42 would become the curve 48, which is "parallel" to the curve 42 with a constant horizontal distance between. It will be obvious that this curve drops to zero flow at an inlet pressure $P_i$ of 100 pounds per square inch, since at that value there is no pressure differential across the nozzle 2.

In many aircraft gas turbines the combustion chamber pressure $P_c$ is found to follow a definite schedule versus the rate of fuel flow; so that when my fuel system is used in a given case, the rate of fuel flow when plotted against inlet pressure $P_i$ will be found to lie approximately on curve 38 at idling flow 44, to lie from 5 to 15 pounds per square inch to the right of curve 42 at cruising flow 45, to lie from 35 to 50 pounds per square inch to the right of curve 42 at take-off flow 46, and from 50 to 75 pounds per square inch to the right of curve 42 at military rating flow 47. In each case the horizontal distance by which inlet pressure $P_i$ is displaced from the curve 42 shown in Fig. 2 is exactly the combustion chamber pressure $P_c$ at the particular value of $P_i$. A curve can be drawn through the points thus determined. My entire system can be readily designed to take these factors into account.

If biasing conduit 35 is not used, line 48 no longer occupies the position shown in Fig. 2, but would assume a position intermediate lines 48 and 42. In other words, the effect of increasing combustion chamber pressure $P_c$ above atmospheric pressure is somewhat compensated when the biasing conduit 35 is not used. A careful mathematical analysis is required to determine this case precisely. I have made such analyses and have designed a number of my fuel systems to operate with biasing conduit 35 not connected.

Mechanically, my arrangement including the single flow divider 3 supplying fuel to a number of nozzles 2 from manifold 30 is far superior to other known arrangements which have some sort of metering device associated with each separate nozzle. With my nozzle system, it is much easier to obtain uniform performance from the individual nozzles, and this is a very important feature of my system. Also, it is possible to change the characteristics of the entire nozzle system readily by merely substituting a re-designed flow divider, without changing the nozzles or other components.

Also, it is possible to obtain more precise operation with the single relatively large flow divider 3 than would be possible with small and intricate metering devices associated with each nozzle. Further, my system is simpler and much less costly than would be a system having separate devices in each nozzle.

Nozzle

One type of wide range nozzle particularly suited for use in connection with the invention is of the duplex type having a discharge orifice, a vortex whirl chamber, two separate sets of orifices or ports for supplying fluid to the vortex chamber, and a fluid supply system arranged to supply fluid to the separate ports at various pressures in order to secure a desired total flow rate, while still preserving the velocities required in the vortex chamber to produce a spray with satisfactory characteristics. Such a nozzle is capable of producing a well atomized spray having a pattern in the form of a wide angled cone which is stable over an extremely wide range of flow rates. A nozzle of this type is more particularly described in the above-mentioned copending application of Fulton et al., Serial No. 724,408, filed January 25, 1947.

Flow divider

The metering device or "flow divider" 3 of Fig. 1 is shown more in detail and to a larger scale in Fig. 3. It comprises a casting 83 having an axial bore forming the interior chamber 23, and a removable head member 84 secured by suitable threaded fastenings 85 to the body 83. Clamped securely between head 84 and body 83 is a disk 86, which may be provided with gaskets 87 and 88 for the prevention of leakage.

The disk 86 serves as a support for one end of a compression spring 44. One end of a flexible bellows 26 is secured, as by silver soldering or brazing, to an axially extending flange 89 defining a central opening in disk 86. The opposite end of bellows 26 is similarly secured to the outer surface of a cup-shaped member 90 carried on the lower end of spindle 91. The upper end of this spindle projects through a circular opening in head 84 into chamber 34. A threaded opening 92 provides means for connecting the pressure sensing line 35 of Fig. 1 to the flow divider, if desired. A shoulder 93 forms a stop for engaging head member 84 to limit the upward travel of spindle 91. A slot 94 extending transversely through the upper end of spindle 91 provides a passage communicating between chamber 34 and the interior of bellows 26. It will be obvious that instead of a slot extending entirely through spindle 91, one or more longitudinal grooves may be provided in the outer surface of the spindle 91 for the same purpose.

At the lower end of spindle 91 there is provided a flange 95, a first threaded portion 96, and a second smaller diameter threaded portion shown in dotted lines at 97.

A spider member consisting of a central cylindrical part 98 and at least two, but preferably three or more, radially extending arms 43, is threaded onto the thread 96. This spider serves to clamp the cup member 90 tightly against flange 95, to guide the moving element at its lower end, and to form a seat for the lower end of spring 44. If necessary, a suitable gasket may be inserted between flange 95 and cup member 90.

The carefully contoured metering pin 27 is provided with a threaded bore 99 arranged to engage the threaded portion 97 of spindle 91. A suitable locking device 100 is provided for preventing rotation of metering pin 27 relative to the thread 97. This locking device may consist of a washer having a non-circular hole cooperating with a flattened portion on thread 97 (so as to prevent rotation of the washer relative to thread 97), and being deformed after assembly, as shown in Fig. 3, so as to project into a recess 101 formed in the outer surface of metering pin 27. This is a conventional type of locking arrangement for threaded parts, which will be instantly recognized by those skilled in the mechanical arts and therefore need not be described in more detail. It will be apparent that many other suitable types of locking arrangements may be used.

In the full extended position of bellows 26 shown in Fig. 3, metering pin 27 is positioned so as to completely fill the central opening of orifice plate 28. It will be seen that plate 28 is secured to the end wall of chamber 23 by suitable threaded fastenings 102. Orifice plate 28 is provided with an axially extending circumferential portion 103 which serves as a stop against which spider arms 43 engage when the bellows 26 is fully extended. An annular washer 104 is inserted between orifice plate 28 and body 83. The purpose of this is to permit axial adjustment of orifice plate 28 at the time of assembly by using a washer 104 of the proper thickness. The tapped opening 25 in casting 83 provides a means for connecting the liquid inlet line 24 of Fig. 1, while opening 105 provides a connection for the liquid discharge line 29 of Fig. 1.

The method of operation of the flow divider will now be apparent. The liquid inlet pressure $P_i$ is communicated through opening 25 to chamber 23 and through the space between the spider arms 43 to the lower surface of the member 98. It will be seen that the force exerted by the inlet pressure on the exterior of the bellows 26 and member 98 is balanced by the force of the heavy compression spring 44. At a preselected value of inlet pressure $P_i$, the bellows 26 begins to collapse causing the member 98 and the metering pin 27 to be moved upward. As $P_i$ increases a value is eventually reached at which the contour of the outer surface of pin 27 begins to define an annular orifice with the central opening in plate 28. It should be noted that the plate 28 is provided with a streamlined contour 106 so as to reduce fluid friction and turbulence to a minimum.

It will be readily understood that by a proper selection of bellows 26 and spring 44 there will be obtained a definite axial movement of metering pin 27 for each value of pressure differential across the bellows 26, depending on the mechanical characteristics of bellows and spring. Having given the variation in axial position of metering pin 27 as a function of the pressure $P_i$ (or pressure differential $P_i - P_c$ if the sensing line 35 of Fig. 1 is used), then the contour of pin 27 can be designed so as to produce an orifice of a size changing as any desired regular or irregular function of the inlet pressure (or pressure differential). The slight effect of changing back pressure $P_s$ on the position of the metering pin 27 can be taken into account in a manner which will be obvious to those skilled in the art.

Fig. 4 gives a curve 107 which represents the pressure drop across the annular orifice defined between plate 28 and pin 27. It will be seen that the curve 107 begins at a pressure of about 40 pounds per square inch, the value at which curve 42 begins to depart from the curve 33 in Fig. 2. Curve 107 rises to a maximum value at pressures between 200 and 300 pounds per square inch and then falls rapidly to a very low value at around 500 pounds per square inch, the position at which the flow divider reaches its wide open position. Above this point the pressure drop across the flow divider orifice is a straight line function of the initial pressure, and corresponds to the parabolic flow function 41 above the value at which it merges with curve 42 in Fig. 2.

It will be apparent that the rate of liquid flow through the flow divider 3 is represented by the difference between curve 42 and curve 43 in Fig. 2, and is a function both of the pressure drop given by Fig. 4 and the effective area of the orifice defined between plate 28 and pin 27.

It will be seen that with my arrangement the pressure drop in the flow divider does not necessarily always increase with increase in rate of flow; but by suitable design the pressure drop can be made to be a very low value at very high flows, as indicated by the portion of the curve at and above 500 pounds per square inch pressure in Fig. 4. This results in obtaining the maximum possible flow at the lowest possible maximum pressure. This has a most important advantage when the system is used in connection with a gas turbine powerplant, in reducing the amount of power required to pump the large amounts of fuel flowing at high output conditions, in reducing the weight of the entire fuel system, in increasing the life of the fuel pump, and in lessening hazard from high pressures. As noted above, the annular metering orifice of the flow divider is preferably designed so as to give pure throttling with a minimum of fluid friction losses and turbulence.

Since Fig. 4 gives pressure drop $P_i - P_s$ as a function of $P_i$, it follows that the value of $P_s$ corresponding to any particular value of $P_i$ can be obtained by subtracting the ordinate of a point on curve 107 in Fig. 4 from the value of $P_i$ at that point. Thus, it will be seen from Fig. 4 that the "initial pressure" $P_s$ on the large slots 39 of nozzle 2 may be a very irregular function of inlet pressure $P_i$ which is the "initial pressure" on the small slots 40.

The reason why curve 43 drops below curve 38 in Fig. 2 will now be considered. As the rate of flow increases, the large slots become more active and the amount and rotational velocity of liquid in the whirl chamber 37 increases, with the result that an increasing radial pressure gradient is built up in the liquid in chamber 37 by centrifugal force. This means that as the flow rises the "back pressure" on the exits of the small and large slots increases by reason of this pressure gradient in the whirl chamber. Of course a sufficiently rapid increase in the back pressure on the small slots 40 will produce a decrease in the pressure differential across them, with a consequent reduction in flow. Thus the rate of flow through the small slots, represented by curve 43 in Fig. 2, is a function both of the inlet pressure $P_i$ and the "back pressure" built up by the whirling liquid in the vortex chamber as noted above. It is this increase in the back pressure on the small slots which causes curve 43 to fall below curve 38 and actually to decrease at high values of total flow in Fig. 2. It will be recalled that curve 38 is for the small slots operating alone, in which case the amount and velocity of the liquid in the vortex chamber 37 are less than they are along curve 43. Therefore the back pressure on the slots along curve 38 is less than it is along curve 43; and the flow through the small slots is therefore greater. Fig. 2 is based on careful experiments. It will be apparent that the large slot flow is likewise a function of the back pressure built up in the whirl chamber 37 and the value of the initial pressure $P_s$ on the large slots, which latter pressure may vary quite irregularly in accordance with curve 107 in Fig. 4.

From the above it will be seen that the flow characteristics of my complete nozzle system is a complex matter involving many interdependent factors, the effect of all of which must be considered in arriving at a final design which will produce the desired characteristic flow curve 42 in Fig. 2.

While many mechanical modifications of my flow divider are possible, the one I show in Fig. 3 represents a preferred type. Instead of having a bellows as the pressure-sensing element, I may utilize a piston working against a spring in a cylinder, with a shaped port in the side of the cylinder, which is progressively opened and exposed by the piston as the inlet pressure rises.

The method of laying out a liquid fuel spray nozzle system with a flow divider in accordance with my invention, for use in a gas turbine powerplant, may be briefly outlined as follows. First, it must be decided by the powerplant designer what total rate of fuel supply to the combustion chamber or chambers, is required for each point on the power schedule of the powerplant. For instance, it may be decided what fuel rates are required in order to give idling, cruising, take-off, and military power, corresponding to points 44—47 in Fig. 2. The powerplant designer may also want to specify the rate at which characteristic curve 42 changes in the neighborhood of each of these points. The designer of the fuel supply system 4 in Fig. 1 then contributes the schedule of inlet pressure $P_i$ as a function of total fuel flow required by the powerplant; and the combustion chamber designer decides what minimum spray angle at maximum flow is required for satisfactory operation of the combustor 1. Then knowing the spray angle required of the nozzle and the minimum and maximum pressures and rates of flow, the nozzle designer is able to design the whirl chamber 37 and flared discharge orifice 63, 64 so as to give the proper spray angles over the range of flows and pressures called for. Likewise the small slots can be designed with an effective cross-section area to produce the velocities in the whirl chamber needed to maintain a satisfactory spray pattern with the proper angle at the minimum flow required. Having determined the size of the slots, the parabolic flow functions 38 and 41 in Fig. 2 become known. Then it is the job of the flow divider designer to lay out a smooth curve 42 passing through the points specified by the powerplant designer and with the other characteristics required.

It is often convenient to build an experimental model of the nozzle and to obtain from it complete data on the flow through the large slots, flow through the small slots, total flow, and spray angle, as functions of the pressures on the large and small slots. These characteristics can then be plotted and the curves used in designing the flow divider. A simple method is to test the nozzle only up and down the schedule on which it is intended to be operated, measuring the flows and pressures at various points and using these data to design the flow divider. Having established the desired characteristic curve 42, and knowing the axial position of metering pin 27 as a function of inlet pressure $P_i$ and pressure $P_s$, it is possible to design the exterior contour of pin 27 so that the schedule of flow through large slots 39 will, when added to the schedule of small slot flow as represented by curve 43, give total flows equal to the ordinates of curve 42. While this has been described as a step-by-step process, it will of course be appreciated that close cooperation among the designers of the various components is necessary to produce a satisfactory final result, and that some testing may be needed to verify the analytical design of the parts.

The duplex nozzle described herein and my new method and apparatus for operating it results in a liquid fuel spraying system of great versatility, permitting adaptation to many different powerplants having widely diverse requirements, and capable of producing a satisfactory atomized spray pattern in the form of a hollow cone with a preselected minimum vertex angle, over an extremely wide range of operating conditions.

It has been found that the nozzle described, with the flow divider for metering the fuel to the secondary slots, is particularly advantageous for use in gas turbine powerplants for the propulsion of aircraft. The spray pattern produced is well atomized, has satisfactory spray angles, and is stable under the most difficult operating conditions. With my nozzle system, it has been found that the combustor flame is much less likely to "blow out" at high altitudes, and also when the throttle is suddenly reduced from a high flow to a low flow position or vice versa. The ability to thus vary the throttle position suddenly contributes to the maneuverability of a military fighter plane, permits sudden descent with minimum power output as well as frequent and sudden reduction of powerplant operation to the idling condition and rapid acceleration to full power. My system also makes possible a much lower idling speed and power which are important in aircraft jet-propulsion gas turbines. Because of the stable and uniform nature of the fuel spray pattern, combustion efficiency is excellent over a wide range, with the result that the fuel economy of the powerplant is improved and the operating range of the aircraft increased. Powerplant life is prolonged by reason of the lower and more even temperatures resulting from the absence of sudden, non-uniform supply of "slugs" of fuel. It has also been found that use of my system facilitates the initiation of flame in a combustor, for instance if it should happen to blow out at extremely high altitudes or under other difficult operating conditions. My system also makes possible much lower gas temperatures when starting the gas turbine, and more rapid accelerations in starting without excessive temperatures.

It will be seen that I have provided an improved form of liquid fuel spraying nozzle of the duplex type, with a new method and apparatus for operating the nozzle with satisfactory characteristics over an extremely wide range and under adverse operating conditions.

What I claim as new and desire to secure by Letters Patent of the United States, is:

1. In a fuel burning system including a combustor, the combination of a duplex nozzle for discharging fuel into said combustor and having primary slots and secondary slots, means for supplying fuel at a variable initial pressure, first conduit means connecting said supply means to the primary slots for delivering fuel to said slots at the initial pressure, second conduit means connecting said supply means to the secondary slots, and automatic metering means associated with said second conduit constructed and arranged to regulate the flow to the secondary slots as a preselected function of said initial pressure.

2. In a fuel burning system including a combustor, the combination of a duplex nozzle for discharging fuel into the combustor and having primary slots and secondary slots, means for supplying fuel at a variable initial pressure, first conduit means connecting said supply means to the primary slots for delivering fuel to said slots at the initial pressure, and second conduit means connecting the supply means to the secondary slots, and including automatic metering means to regulate the pressure on the secondary slots, said metering means comprising variable orifice means and other means responsive to initial pressure for controlling the effective area of the variable orifice means.

3. In a wide range fuel burning apparatus including a combustor, the combination of a duplex nozzle for discharging fuel into the combustor and having primary slots and secondary slots, a common supply means arranged to supply fuel at a variable initial pressure, first conduit means connecting said supply means to the primary slots, second conduit means connecting said supply means to the secondary slots, and automatic metering means associated with said second conduit and including pressure responsive means to regulate the pressure supplied to the secondary slots as a preselected variable function of said initial pressure.

4. In a wide range fuel burning apparatus including a combustor, the combination of a duplex nozzle arranged to discharge fuel into the combustor and having primary slots and secondary slots, a common supply means to supply fuel at a variable initial pressure, first conduit means connecting said supply means to the primary slots, second conduit means connecting said supply means to the secondary slots, and automatic metering means to regulate the pressure supplied to the secondary slots as a preselected variable function of said initial pressure, said metering means comprising variable orifice means connected to said second conduit means and automatic means responsive to initial pressure for varying the effective area of said variable orifice means.

5. In a wide range fuel burning apparatus including a combustor, the combination of a duplex nozzle arranged to discharge fuel into the combustor and having primary slots and secondary slots, a common supply means to supply fuel at a variable initial pressure, first conduit means connecting said supply means to the primary slots, second conduit means connecting said supply means to the secondary slots, and automatic metering means to regulate the pressure supplied to the secondary slots as a preselected variable function of said initial pressure, said metering means including a member defining a circular orifice, a movable contoured throttling member arranged to move into and out of said orifice to alter the effective area thereof, and a member defining an expansible chamber responsive to initial pressure and arranged to position said throttling member.

6. In a wide range liquid fuel burning system including a combustor adapted to operate at pressures substantially different from atmospheric, the combination of a duplex type nozzle arranged to discharge liquid fuel into the combustor and having primary slots and secondary slots, a common supply means arranged to furnish liquid fuel at a variable pressure, first conduit means connecting said supply means to the primary slots for delivering liquid fuel to said slots at substantially the full initial pressure, second conduit means connecting said supply means to the secondary slots, and automatic metering means associated with said second conduit and arranged to regulate the pressure on the secondary slots to produce a differential across said slots which varies as a preselected function of the differential between said initial liquid fuel pressure and the combustor pressure.

7. In a wide range liquid fuel burning system including a combustor adapted to operate at pressures substantially different from atmospheric, the combination of a duplex type nozzle arranged to discharge liquid fuel into the combustor and having primary slots and secondary slots, a common supply means arranged to furnish liquid fuel at a variable pressure, first conduit means connecting said supply means to the primary slots for delivering liquid fuel to said slots at substantially the initial pressure, second conduit means connecting said supply means to the secondary slots, and automatic metering means associated with said second conduit and arranged to regulate the pressure on the secondary slots to produce a differential across said slots which varies as a preselected variabe function of the differential between said initial liquid fuel pressure and the combustor pressure, said metering means including a member defining a circular orifice, a movable contoured throttling member arranged to move into and out of said circular orifice to alter the effective area thereof, and a member defining an expansible chamber arranged to position said throttling member, said last-named member being arranged to respond to the differential between liquid fuel inlet pressure and combustor pressure.

8. In a fuel burning apparatus including a combustor, the combination of a duplex type nozzle arranged to discharge fuel into the combustor and having primary slots and secondary slots, means for supplying fuel at a variable initial pressure, first conduit means connecting the supply means with the primary slots, and second conduit means connecting the supply means with the secondary slots and including automatic metering means for controlling the flow through said second conduit means, said metering means including a valve having a movable flow controlling member defining a metering orifice of an effective area which varies as a preselected function of flow control member position and mean responsive to said initial pressure for positioning the flow control member.

9. In a wide-range fuel burning apparatus including a combustor, the combination of a duplex type nozzle arranged to discharge fuel into the combustor and having primary slots and secondary slots, common means for supplying fuel at a variable initial pressure, first conduit means connecting the supply means to the primary slots, and second conduit means connecting the supply means to the secondary slots and including automatic metering means for regulating the flow in the second conduit means, said metering means including valve means having a flow control member positioned by a device operable in response to said initial pressure for varying the effective area of the metering means as a preselected function of initial pressure.

10. In a wide range liquid fuel burning system including a combustor adapted to operate at pressures substantially different from atmospheric pressure, the combination of a duplex type nozzle arranged to discharge liquid fuel into the combustor and having primary slots and secondary slots, a common supply means for furnishing liquid fuel at a variable pressure, first conduit means connecting the supply means to the primary slots for delivering liquid thereto at substantially the full initial pressure, second conduit means for supplying liquid to the secondary slots, and automatic metering means including a valve in the second conduit having a flow control member arranged to vary the effective orifice area of the metering means as a preselected function of position of the flow control member, and pressure responsive means for positioning the flow control member in accordance with said initial liquid pressure acting in opposition to combustion space pressure.

CHARLES D. FULTON.

REFERENCES CITED

The following references are of record in the file of this patent:

UNITED STATES PATENTS

| Number | Name | Date |
|---|---|---|
| 1,517,598 | Stevenson | Dec. 2, 1924 |
| 1,850,423 | Taylor | Mar. 22, 1932 |
| 1,958,644 | Smith | May 15, 1934 |
| 2,117,388 | Woolley | May 17, 1938 |
| 2,148,509 | Shafer | Feb. 28, 1939 |
| 2,213,785 | Larson et al. | Sept. 3, 1940 |
| 2,286,581 | Scott | June 16, 1942 |
| 2,315,412 | Galumbeck | Mar. 30, 1943 |
| 2,389,758 | Bittermann | Nov. 27, 1945 |